United States Patent
Huling

[11] Patent Number: 6,117,467
[45] Date of Patent: Sep. 12, 2000

[54] METHOD AND APPARATUS FOR STUFFING FOODSTUFFS

[76] Inventor: Thomas W. Huling, 231 Bradford Dr., Carencro, La. 70520

[21] Appl. No.: 09/249,366

[22] Filed: Feb. 11, 1999

[51] Int. Cl.$^7$ .................. A23L 1/00; A23L 1/22
[52] U.S. Cl. ................ 426/281; 426/282; 99/345; 99/450.7; 99/450.8; 99/494
[58] Field of Search .................. 426/281, 282, 426/92, 102, 89, 518; 99/494, 345, 450.7, 450.8; 222/80–82, 89

[56] References Cited

U.S. PATENT DOCUMENTS

| | | | |
|---|---|---|---|
| 774,394 | 11/1904 | Peter | 99/494 |
| 916,441 | 3/1909 | Hackmann | 99/494 |
| 921,980 | 5/1909 | Hackmann et al. | 99/494 |
| 2,118,976 | 5/1938 | Larkin | 99/494 X |
| 2,124,700 | 7/1938 | Hartzell | 99/494 |
| 2,473,191 | 6/1949 | Bettencourt | 99/494 |
| 2,776,634 | 1/1957 | Morton | 99/494 X |
| 2,784,682 | 3/1957 | Clevenger | 99/494 X |
| 3,483,810 | 12/1969 | Peters et al. | 99/494 X |
| 3,754,469 | 8/1973 | Gasior | 99/494 X |
| 4,178,660 | 12/1979 | Olney et al. | 99/494 |
| 4,211,160 | 7/1980 | Bieser | 99/494 |
| 4,414,885 | 11/1983 | Kelly | 99/494 |
| 4,641,573 | 2/1987 | Gunn | 99/494 X |
| 4,703,688 | 11/1987 | Ochs | 99/494 X |

*Primary Examiner*—Milton Cano
*Attorney, Agent, or Firm*—Jesse D. Lambert

[57] ABSTRACT

Apparatus for preparation of foods and methods for using the apparatus. The apparatus comprises an elongated hollow sleeve having a generally square cross section and a square longitudinal bore. One end of the sleeve is cut at an angle forming a pointed tip, while the other end has an enlarged head attached thereto. A window is cut through the wall of the sleeve intermediate the two ends. An elongated plunger (having a length less than that of the sleeve) is removably disposed within the bore of the sleeve and may be rotated and reciprocated within the sleeve. One end of the plunger has a rounded point, while the other end has an enlarged head which provides a positive stop to passage of the plunger within the sleeve. To use the apparatus to insert stuffings within a body of meat, the plunger is inserted full length into the sleeve, and the sleeve and plunger together are pushed at least partially into the meat. The plunger is then withdrawn sufficiently far to expose the window. A stuffing mixture may then be loaded into the sleeve bore through the window. By forcing the plunger forward, the stuffing is pushed into the meat. The apparatus (plunger and sleeve together) is then removed, leaving the stuffing in place within the meat. Other uses include stemming and coring of fruits and vegetables, and meat tenderization.

7 Claims, 5 Drawing Sheets

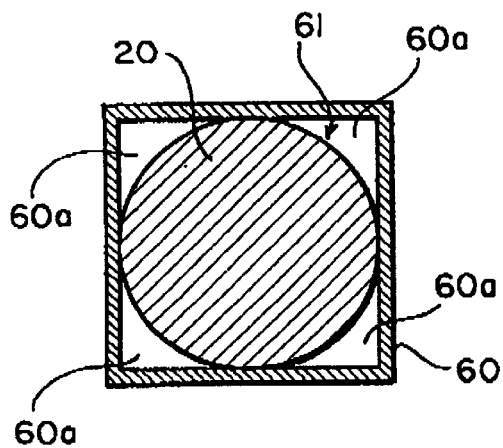
FIG. 5a
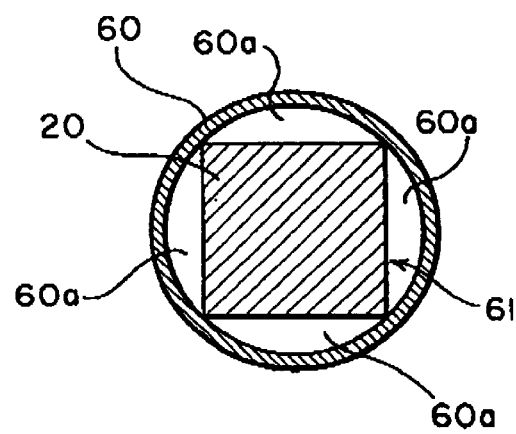
FIG. 5b
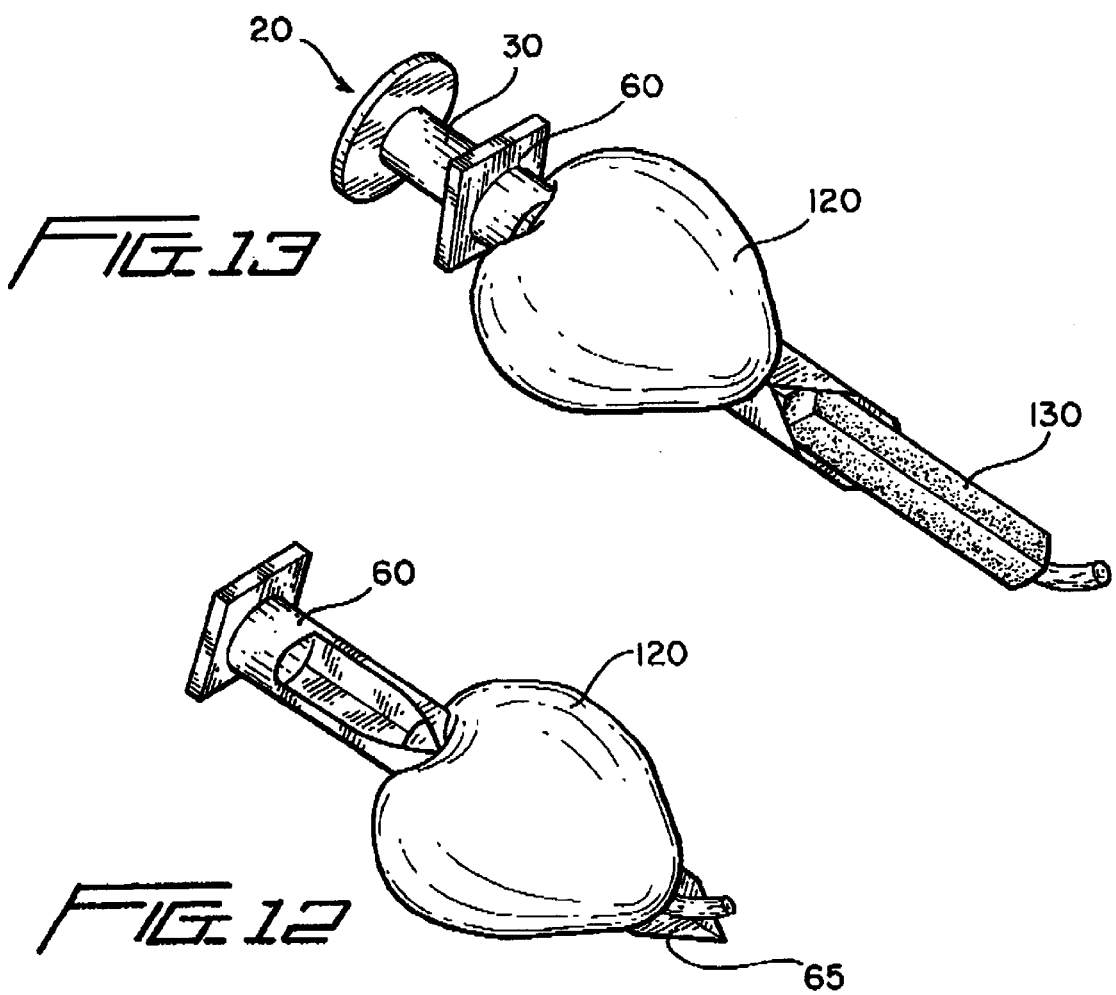
FIG. 13
FIG. 12

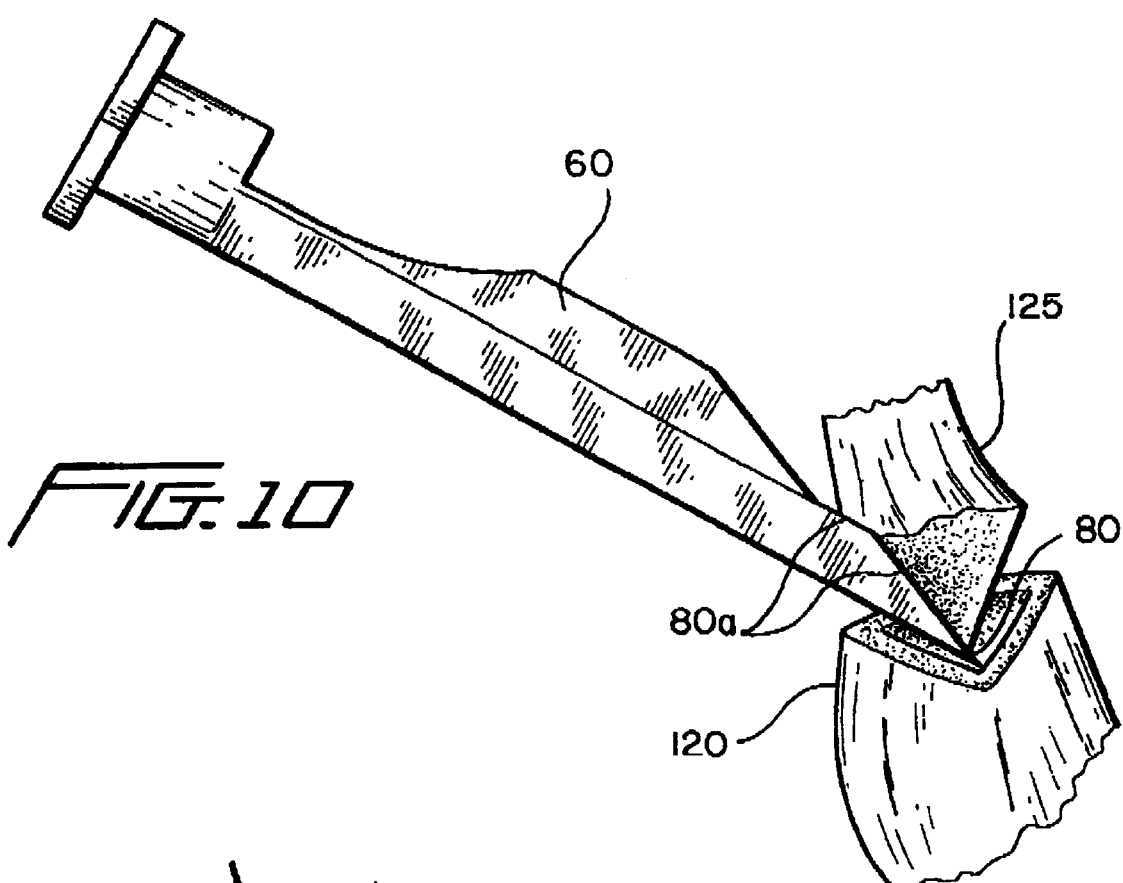
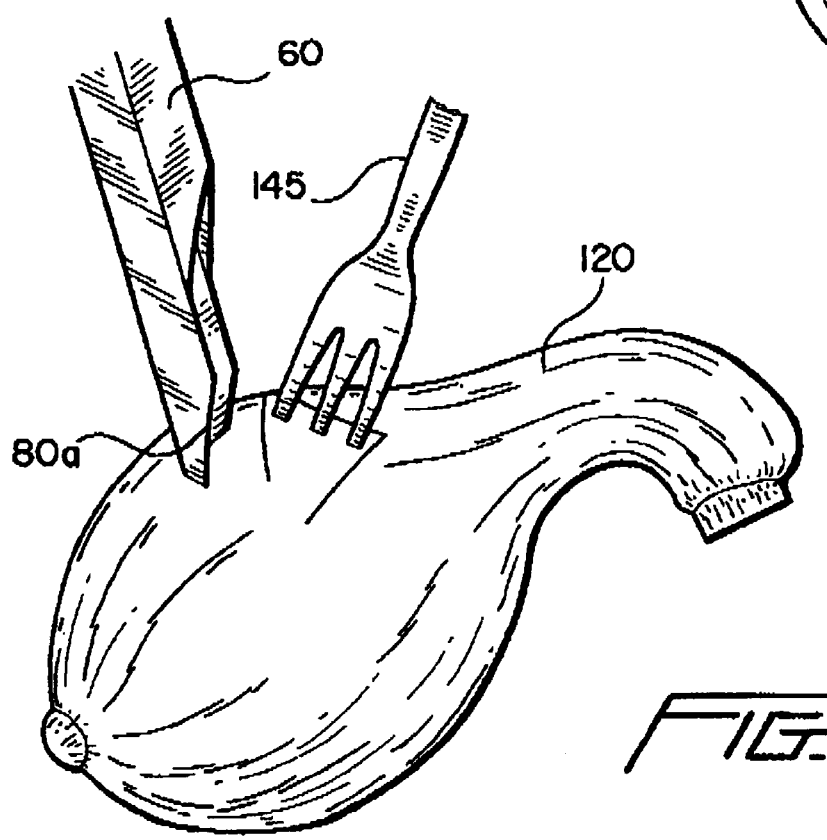

METHOD AND APPARATUS FOR STUFFING FOODSTUFFS

BACKGROUND

1. Field of the Invention

The present invention relates generally to apparatus for preparation of various foods prior to consumption and/or cooking. With further specificity, the present invention relates to apparatus for insertion of stuffings, which may comprise seasonings, spices, vegetables and the like into bodies of foods, including meats, poultry, vegetables and fruits; for stemming and coring of various vegetables and fruits; and for tenderizing of meats.

2. Related Art

Different techniques are used to prepare foods for consumption. For example, some foods, particularly meats, greatly benefit from "stuffing", that is, the insertion into the body of the meat a quantity of desired seasonings, spices, vegetables, other meats, etc. Meats such as large roasts and whole fowls have a relatively large volume combined with a relatively small surface area for surface application of spices and seasonings. Stuffing the body of meat therefore permits a much greater volume of seasoning to be applied. Other materials may also be used for stuffing, such as vegetables (onions, garlic and the like), and other meats (sausage mix stuffed into a roast, or crawfish or crab meat stuffed into other meats). Stuffing procedures can also be used on vegetables.

Although various devices have been used to stuff foods, drawbacks accompany them. For example, a knife blade may be used to pierce the meat, then push back the meat to form a pocket. The stuffing mix must then be pushed into place by hand, and the cavity thus created is usually of very limited volume. In addition, the flap of meat must often be held closed with toothpicks or the like, posing problems when such fixtures fall out, etc.

Yet another preparations method involves the tenderizing of meats. Although tenderization may take different forms, one method is by making numerous small cuts at least partially into the body of meat, to sever meat fibers and thereby ease later cutting and consumption of the meat. A knife has been used for such procedures, by piercing the body of meat with the point of the knife to a desired depth. However, using a knife in this manner has a number of drawbacks. A large number of blade insertions must be made, as only one cut at a time is made. The ever-present safety concerns of using a knife in this manner exist. Finally, depth control of the piercing may be difficult.

Preparation of various fruits and vegetables often involves removal of stems and/or a central core. In particular for coring, use of a knife blade for this process is difficult, as the knife must be inserted completely through the vegetable, then a circular cut made to encircle the core. Often, the vegetable or fruit is unintentionally cut into two pieces by the knife blade slipping.

SUMMARY OF THE PRESENT INVENTION

The present invention comprises an apparatus adapted for use as a stuffer for foods, including bodies of meats, poultry, vegetables and fruits; as a tenderizing device for meats; and as an apparatus for expedient stemming and coring of fruits and vegetables. The apparatus comprises an elongated, square in cross section tubular sleeve, having a circular in cross section plunger removably disposed within the bore of the sleeve. The plunger may be rotated and moved longitudinally within the sleeve. A first end of the sleeve is angled so as to form a point for easy insertion into foods, while the second end of the sleeve has an enlarged head for ease of gripping. A window is cut into the wall of the sleeve along its length intermediate the first and second ends. The plunger has a first, rounded end insertable into the bore of the sleeve. The second end of the plunger has an enlarged head, providing a positive stop to travel of the plunger within the sleeve bore. The diameter of the plunger is just slightly less than an inner width of the sleeve, so that the plunger may be readily moved longitudinally within the sleeve, yet only a small amount of side-to-side movement of the plunger within the sleeve bore is possible. Since the plunger is circular in cross section, and the bore of the sleeve is square, passages are thereby created at each corner of the plunger/sleeve annulus where the plunger does not fully occupy the sleeve bore area. These passages, which travel the length of the plunger, permit passage of air into the apparatus, which permits movement of the plunger without generating a pumping or suction effect.

BRIEF DESCRIPTION OF THE DRAWINGS

FIGS. 5a and 5b are cross section views of different embodiments of the apparatus.

FIG. 10 shows use of the apparatus to remove the stem of a vegetable.

FIG. 11 shows use of the apparatus to remove a cube from a vegetable.

FIGS. 12 and 13 illustrate coring of a vegetable using the apparatus of the present invention.

DETAILED DESCRIPTION OF THE PREFERRED EMBODIMENT

Although many different embodiments of apparatus 10 of the present invention are possible, with reference to the drawings one embodiment is described herein.

Figure 1:
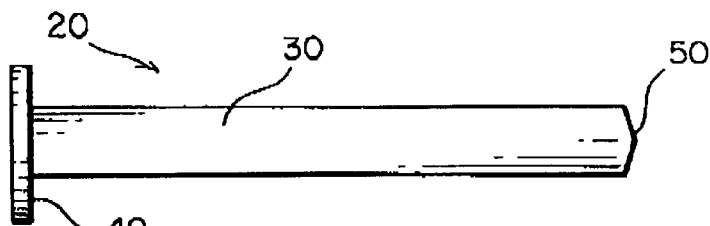
FIG. 1 is a schematic of the plunger of the present invention.

As seen in FIG. 1, the apparatus comprises an elongated plunger 20 having a shaft 30 and a head 40 at one end. Shaft 30 has a generally circular cross section. The end of shaft 30 distal from head 40 comprises a rounded, blunt point 50. Plunger 20 may be formed from a variety of materials, including metals (such as stainless steel) and high strength plastic. Methods of forming include casting plunger 20 or turning plunger 20 to a desired size from a larger piece. Head 40 and shaft 30 may integral, or head 40 may be a separate piece attached to shaft 30 by a screw, welding, or other suitable means.

Figure 2:
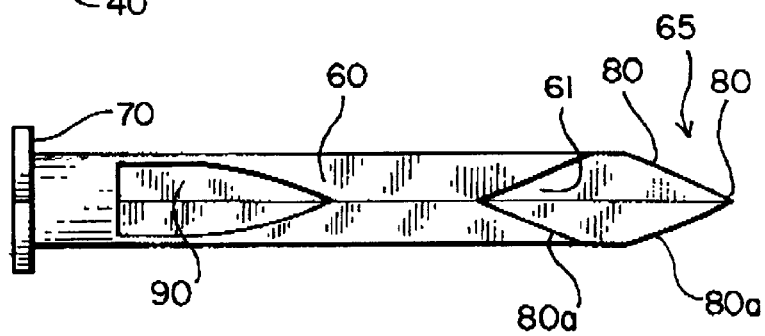
FIGS. 2 and 3 are two views of the sleeve of the present invention.
Figure 3:
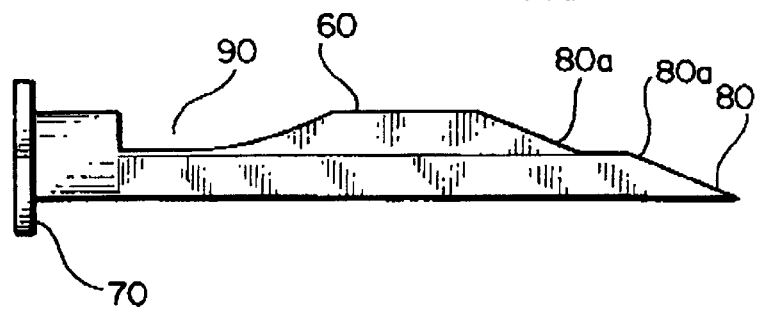

FIGS. 2 and 3 show two views of elongated sleeve 60 of the present invention. Sleeve 60, in the preferred embodiment, is square in cross section with a square longitudinal bore 61. A first end of sleeve 60 comprises an enlarged head 70. A second end 65 of sleeve 60 is cut at an angle so as to form a stepped point 80 for easy insertion into a foodstuff, as will be described herein. The edges 80a formed by cutting sleeve 60 at a point, in the preferred embodiment, are sharpened and/or serrated. Sleeve 60 may be formed of metals (such as stainless steel, plated brass, or other suitable materials) or plastic hollow square stock. Head 70 may be integral with the remainder of sleeve 60, or may be separate and joined thereto by welding or other suitable means. Sleeve 60 also comprises a window 90 cut through the wall of sleeve 60, as seen in FIGS. 2 and 3, intermediate the ends of sleeve 60. Window 90 permits placement of stuffing into sleeve 60 of apparatus 10, for placement into foods as will be later described.

Figure 4:
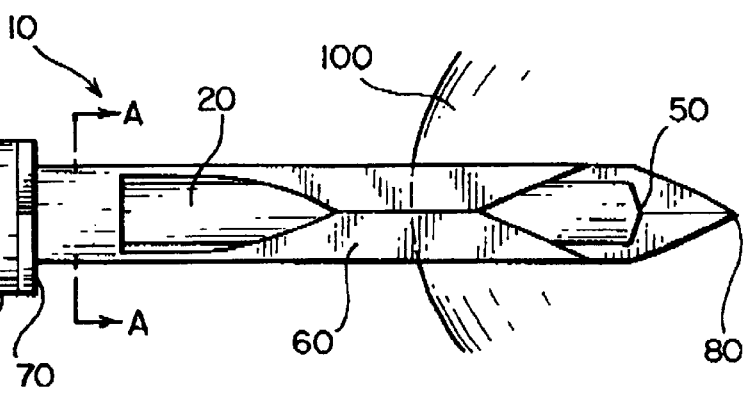
FIG. 4 is a schematic of the apparatus of the present invention, showing the plunger inserted full depth into the sleeve and the apparatus inserted into a meat.
Figure 5:
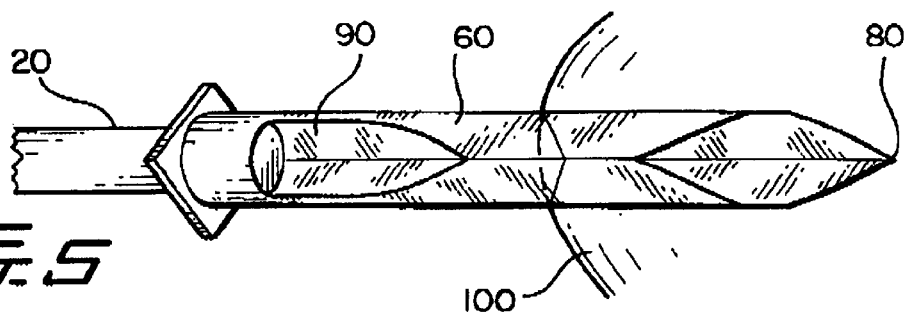
FIG. 5 is a view of the apparatus still inserted into a meat, and showing the plunger partially withdrawn from the sleeve but still engaged therein.

FIGS. 4 and 5 illustrate plunger 20 inserted into sleeve 60. In FIG. 4, plunger 20 is advanced to its maximum depth into sleeve 60, then apparatus 10 has been inserted into a body of meat 100 to a desired depth. In that position, contact of head 40 of plunger 20 with head 70 of sleeve 60 provides a positive stop to insertion of plunger 20. In the preferred embodiment, the length of plunger 20 is somewhat less than the length of sleeve 60, so that when plunger 20 is fully inserted into sleeve 60, point 50 does not extend as far as point 80. A typical length relationship between plunger 20 and sleeve 60 is shown in FIG. 4. When stuffing meats, it is important that plunger 20 be inserted its full length into sleeve 60 before the apparatus is inserted into the meat; the presence of plunger 20 prevents what is in effect a core of meat from being formed within bore 61.

In FIG. 5a, which is a cross section along section A—A of FIG. 4, the circular cross section of plunger 20 within bore 61 of sleeve 60 leaves passages 60a at each corner. Passages 60a permit air to escape from sleeve 60 as plunger 20 is advanced into sleeve 60, and permit air to enter bore 61 as plunger 20 is withdrawn from sleeve 60. Such air passage prevents pumping or suction effects caused by a plunger substantially filling the bore of sleeve 60. The diameter of plunger 20 and the width of bore 61 are preferably such that plunger 20 is in contact with the walls of sleeve 60, while permitting longitudinal movement of plunger 20 within sleeve 60. It is understood that although the preferred embodiment comprises a circular in cross section plunger within a square bore, the present invention also encompasses other combinations of discontiguous cross-section shapes, such as for example, a square in cross section plunger within a circular bore, as in FIG. 5b. Like parts are similarly numbered therein.

FIG. 5 illustrates sleeve 60 pushed into a meat 100, with plunger 20 partially withdrawn.

Figure 6:
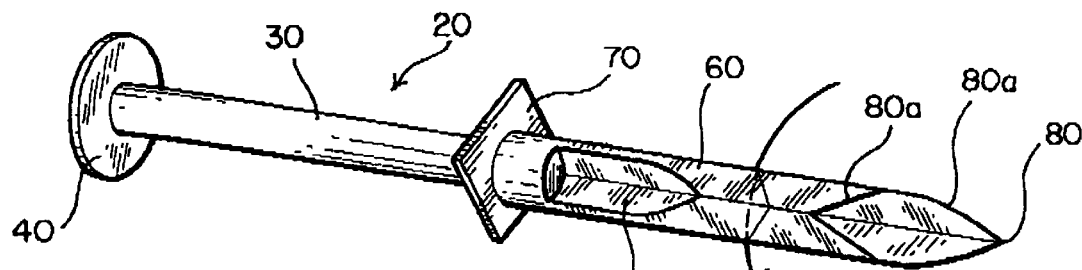
FIGS. 6 through 9 illustrate use of the apparatus to place a stuffing into a body of meat.
Figure 7:
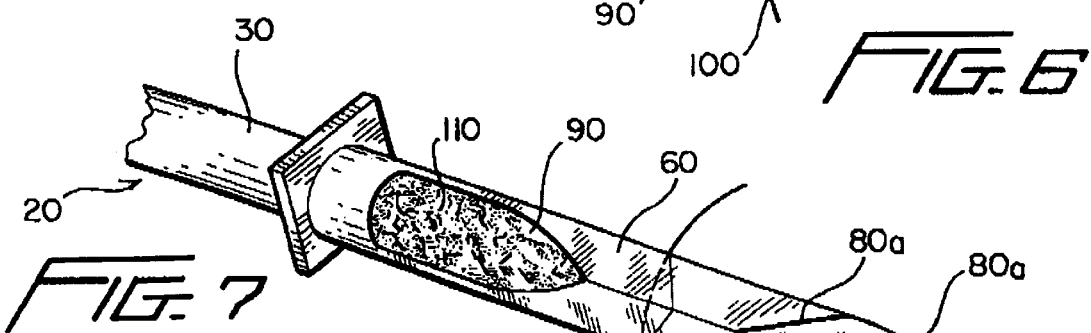
Figure 8:
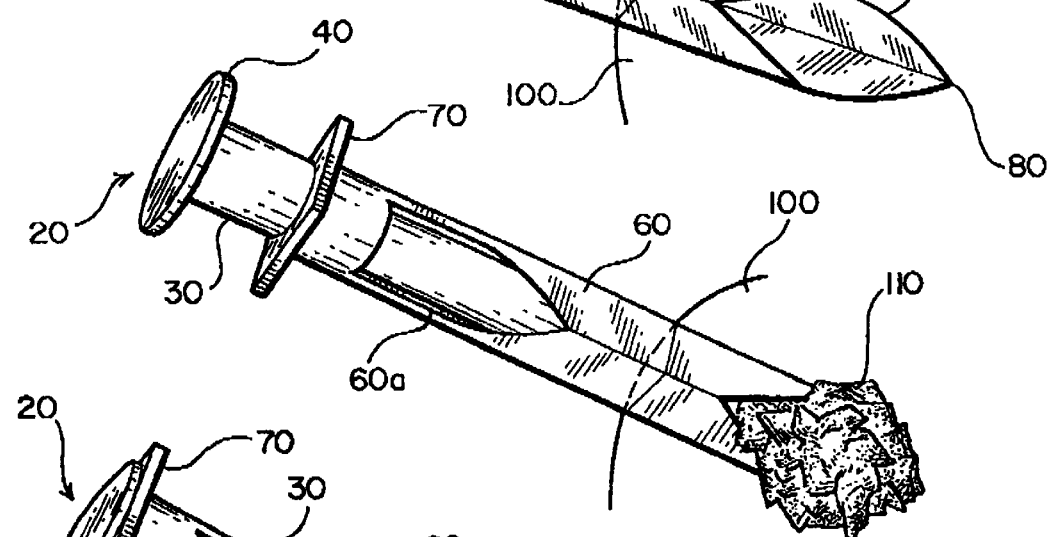
Figure 9:
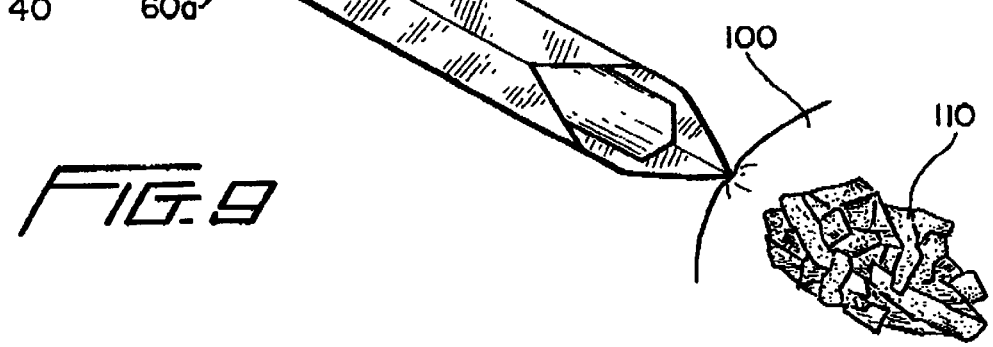

FIGS. 6 through 9 illustrate a sequence of use of the apparatus of the present invention. In FIG. 6, after the apparatus has been inserted to a desired depth into meat 100, plunger 20 is withdrawn a sufficient distance that window 90 is unobstructed, and sleeve 60 may be readily filled. In FIG. 7, a desired stuffing 110 (which, by way of example only, may comprise spices and seasoning, vegetables such as onions or garlic, or other meats such as sausage, or any combination thereof is placed into sleeve 60, through window 90. By pushing plunger 20 into sleeve 60, as shown in FIG. 8, stuffing 110 is forced out of sleeve 60 into meat 100. After plunger 20 is advanced completely into sleeve 60, sleeve 60 and plunger 20 can be withdrawn together, as shown in FIG. 9. Once the apparatus is withdrawn, the entry into meat 100 tends to close, covering stuffing 110 and maintaining the stuffing within the meat without the need for toothpicks, etc. to hold the entry closed. As plunger 20 is pushed into sleeve 60, any trapped air can flow out of the apparatus through passages 60a. In like manner, it can be seen that passages 60a permit air to enter the cavity created in meat 100 through the apparatus as the apparatus is withdrawn, preventing the tendency for stuffing 110 to be pulled from meat 100 by a suction effect, when apparatus 10 is withdrawn.

FIG. 10 illustrates vegetable or fruit stem removal using sleeve 60. As can be seen, point 80 and edges 80a of sleeve 60 can be used to make cuts around the circumference of vegetable 120, at or near the base of stem 125. Since edges 80a of sleeve 60 make, in effect, two cuts (by the two adjoining sides), in most instances two of such cuts are sufficient to encircle stem 125 and permit its removal. Such process is superior to use of a knife to remove the stem, which is much harder to control and presents a greater danger of cutting the user. It is understood that a vegetable is illustrated by way of example only, and several different types of fruits and vegetables may be thus processed.

In FIG. 11, sleeve 60 is used to cut cubes out of vegetable 120. Such cubes may be consumed before or after cooking, or in any application where the vegetable must be cut up before preparation. Sleeve 60 is inserted to a desired depth thereby making two intersecting cuts, removed, then re-inserted so as to make cuts joining the first cuts. A fork 145 or other implement may be used to aid in extracting the cube. One common use for vegetable cubes is in making meat and vegetable kabobs. It is understood that a vegetable is illustrated by way of example only, and several different types of fruits and vegetables may be thus processed.

FIGS. 12 and 13 show use of apparatus 10 to core vegetables, fruits and the like. To core, sleeve 60 is forced through vegetable 120 with the central core roughly centered within sleeve 60. Upon sleeve 60 completely penetrating vegetable 120, as in FIG. 12, the core will be within bore 61 of sleeve 60. Then, plunger 20 is pushed through sleeve 60, pushing core 130 out of sleeve 60. Sleeve 60 can then be withdrawn (with plunger 20 inside), leaving a central hole through vegetable 120 where core 130 was removed. It is understood that a vegetable is illustrated by way of example only, and several different types of fruits and vegetables may be thus processed.

Figure 14:
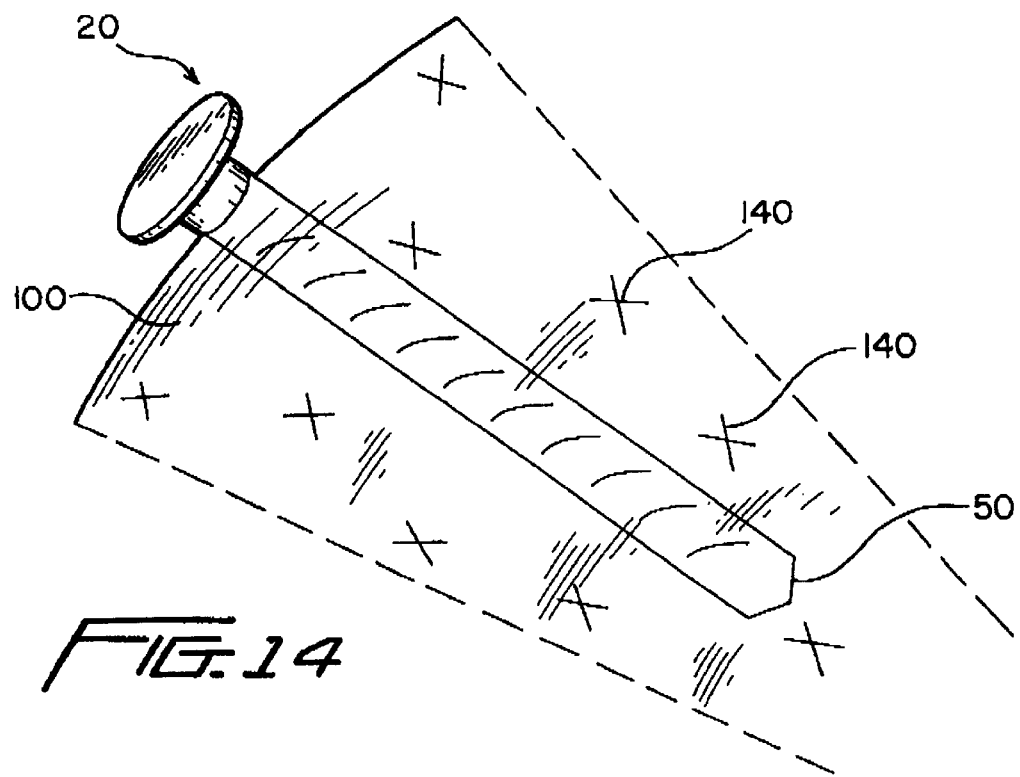
FIGS. 14 and 15 illustrate use of the apparatus to tenderize meats.
Figure 15:
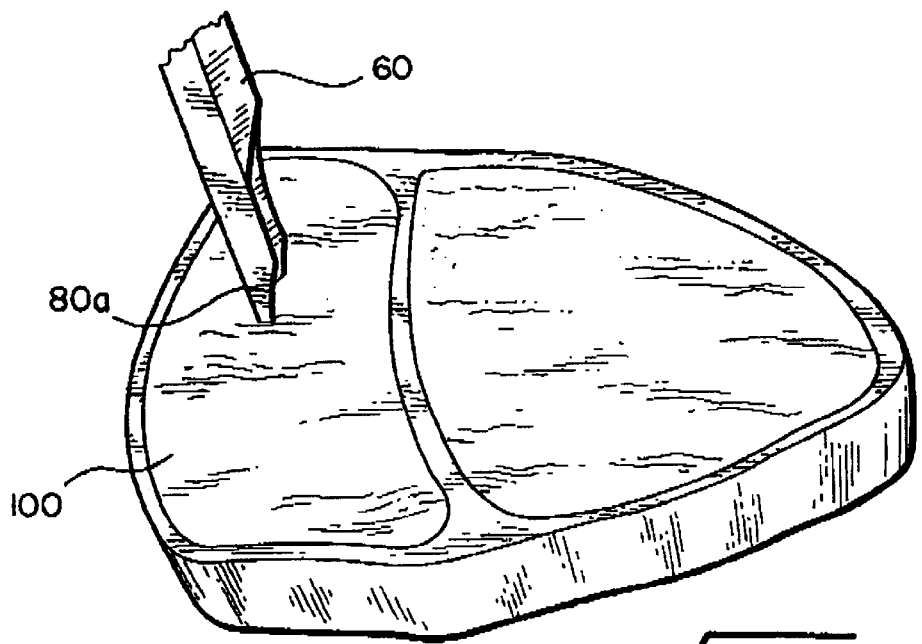

As previously described, apparatus 10 may also be used for tenderizing meats. Both deep tenderizing (typically on large bodies of meat) and shallow tenderizing (typically on thinner cuts of meat) may be done. FIG. 14 illustrates a deep tenderizing procedure, where plunger 20 is forced into meat 100 in a desired pattern, as depicted by pattern 140. The rounded point 50 of plunger 20 is sufficiently sharp to penetrate the meat, while not presenting the safety hazards that the use of a knife for tenderization pose. FIG. 15 is another tenderization procedure, using sleeve 60. That tenderizing procedure generally utilizes the sharpened edges 80a of sleeve 60 to pierce a meat in multiple places, thereby severing the meat fibers and making the meat easier to consume. With a thinner cut of meat 100, the sharpened point 80 and edges 80a of sleeve 60 may be used to pierce the meat in a desired pattern, each piercing forming a modified "V" shape cut, or in effect two cuts with each piercing. Using sleeve 60 in such manner is much more efficient than single cuts using a knife blade.

The two parts of the apparatus, namely plunger 20 and sleeve 60, may be taken apart for easy cleaning.

By the described examples, it can be seen that the apparatus of the present invention lends itself to multiple food preparation uses. Although the description contains many specificities, such are not to be considered in a limiting sense but only as examples of currently preferred embodiments of the apparatus and methods of its use. Many different embodiments of the apparatus are possible. For example, different cross sectional shapes of plunger 20 and sleeve 60 are possible, such as a square plunger 20 within a circular sleeve 60, as shown in FIG. 5*b*. Other combinations of discontiguous cross section shapes are possible. Plunger 20 and sleeve 60 may be made of a variety of materials, including metals such as stainless steel, or hard plastic. More than one window 90 may be included. Dimensions of plunger 20 and sleeve 60 may be varied to suit the user. Further, the exact shape of the tip of sleeve 60 and window 90 may be altered.

Thus, the scope of the invention should be determined by the appended claims and their legal equivalents, rather than by the examples given.

I claim:

1. An apparatus for stuffing bodies of food, comprising:

a) an elongated hollow sleeve having walls and a longitudinal bore, said longitudinal bore having a cross sectional shape being substantially the same along its length, said sleeve having first and second ends, said first end being cut at an angle forming a point, said sleeve further having a window cut through said walls intermediate said first and second ends; and b) an elongated plunger removably disposed within said bore of said sleeve, said plunger having first and second ends, said plunger further having a cross-sectional shape continuous along its length and dimensioned so as to fit within said bore of said sleeve, said cross-sectional shape of said plunger being different from said cross sectional shape of said bore of said sleeve.

2. The apparatus of claim 1, wherein:

a) said second end of said sleeve comprises an enlarged head; and b) said second end of said plunger comprises an enlarged head, and a length of said plunger is less than a length of said sleeve.

3. The apparatus of claim 2, wherein said bore of said sleeve is square in cross section, and said plunger is circular in cross section, a diameter of said plunger resulting in said plunger bearing against the walls of said bore of said sleeve, so that when said plunger is disposed within said bore of said sleeve a plurality of longitudinal annular passages are formed within said sleeve.

4. The apparatus of claim 3, wherein said sleeve and said plunger are of stainless steel.

5. The apparatus of claim 3, wherein said sleeve and said plunger are of plastic.

6. The apparatus of claim 2, wherein said bore of said sleeve is circular in cross section, and said plunger is square in cross section, the dimensions of said plunger resulting in said plunger bearing against the walls of said bore of said sleeve, so that when said plunger is disposed within said bore of said sleeve a plurality of longitudinal annular passages are formed within said sleeve.

7. A method of placing stuffing into a body of food, comprising the steps of:

a) providing a stuffing apparatus comprising:

i) an elongated hollow sleeve having walls and a longitudinal bore, said longitudinal bore having a cross sectional shape being substantially the same along its length, said sleeve having first and second ends, said first end being cut at an angle forming a point, said sleeve further having a window cut through said walls intermediate said first and second ends; and ii) an elongated plunger removably disposed within said bore of said sleeve, said plunger having first and second ends, said plunger further having a cross-sectional shape continuous along its length and dimensioned so as to fit within said bore of said sleeve, said cross-sectional shape of said plunger being different from said cross sectional shape of said bore of said sleeve;

b) inserting said apparatus into a body of food to a desired depth;

c) withdrawing said plunger a sufficient distance so that said window is at least partially cleared, and thereafter inserting a quantity of stuffing into said bore of said sleeve;

d) advancing said plunger into said sleeve, thereby forcing said stuffing into said body of food; and e) withdrawing said apparatus from said body of food.

* * * * *